United States Patent [19]

Hagan

[11] 4,093,575

[45] June 6, 1978

[54] THERMOSETTING VINYL CHLORIDE POLYMER POWDER COATINGS

[75] Inventor: Joseph Weldon Hagan, Warren, N.J.

[73] Assignee: Union Carbide Corporation, New York, N.Y.

[21] Appl. No.: 685,541

[22] Filed: May 12, 1976

[51] Int. Cl.$^2$ .................................................. C08L 1/14
[52] U.S. Cl. ........................................ 260/15; 260/13; 260/14; 260/17 A
[58] Field of Search ................... 260/13, 14, 15, 17; 526/320, 345

[56] References Cited

U.S. PATENT DOCUMENTS

| | | | |
|---|---|---|---|
| T924,003 | 9/1973 | Fouk et al. | 260/17 R |
| 2,686,172 | 8/1954 | Wolf | 526/320 |
| 3,370,025 | 2/1968 | Salo et al. | 260/14 |
| 3,755,271 | 8/1973 | Montgomery | 526/320 |
| 3,790,513 | 2/1974 | Victorius | 260/15 |
| 3,844,993 | 10/1974 | Miller et al. | 260/17 R |
| 3,846,368 | 11/1974 | Pettit, Jr. | 260/15 |
| 3,862,062 | 1/1975 | Harper | 260/15 |
| 3,862,063 | 1/1975 | Pettit | 260/15 |
| 3,884,887 | 5/1975 | Montgomery | 526/320 |
| 3,886,129 | 5/1975 | Kurz et al. | 526/320 |
| 3,887,642 | 6/1975 | Vandersmissen | 526/320 |
| 3,900,435 | 8/1975 | Wingler et al. | 260/17 |
| 3,970,633 | 7/1976 | Miller et al. | 526/320 |

*Primary Examiner*—Edward M. Woodberry
*Attorney, Agent, or Firm*—Francis M. Fazio

[57] ABSTRACT

Powder coating compositions of blends of (1) vinyl chloride polymers having pendant hydroxyl groups, (2) a suitable crosslinker and (3) cellulose acetate butyrate have been produced and applied to a substrate and cured to form smooth, uniform coatings. The compositions can also contain certain blocked catalysts for improved cure.

5 Claims, No Drawings

THERMOSETTING VINYL CHLORIDE POLYMER POWDER COATINGS

BACKGROUND OF THE INVENTION

The coatings industry is undergoing massive changes in its philosophy, a great deal thereof being the result of the ecological problems associated with the use of the conventional solvent-based coating compositions. In the past the most commonly used coatings were compositions of pigmented or unpigmented vehicles that were diluted with solvents to facilitate application. After application on the surface, the solvents were permitted to evaporate, often into the atmosphere, leaving a dry, uniform coating on the surface. With time, advances led to the development of organosols, plastisols, emulsions, dispersions, 100 per cent reactive solids coatings, waterborne coatings, all of which are used today to some extent. In addition, within the past two decades much effort has been expended in the preparation and application of powder coatings, the initial impetus therefor being the discovery of the fluidized-bed technology in Germany. This initial effort in the powder coating field involves the submersion of a preheated article into a bed of powder particles, the particles generally being from 50 to 150 microns in size, fluidized by a stream of gas. On immersion in the fluidized-bed, powder particles adhere and coalesce on the surface of the article forming a uniform coating, usually in excess of 5 mils thick and often as much as 100 mils thick. The relatively large particle sizes required for fluidized-bed coating technology precludes the formation of the thin coatings of from 0.2 to 2 or 3 mils thick that are often desired. Many further attempts have been made to apply such thin coatings, the most recent efforts being directed to the electrostatic spray coating of particles to the grounded article to be coated followed by heating to fuse the particles and form a uniform coating. This method has recently been finding wide acceptance because of the many advantages associated therewith, e.g., improved film properties, absence of volatile solvents, elimination of water pollution problems, essentially 100 per cent utilization of material, reduced capital expenditures, ease of changeover. Recent developments include the acrylic powders disclosed in U.S. Pat. No. 3,862,062 and U.S. Pat. No. 3,862,063; however, these patents do not relate to vinyl chloride polymer based powders but to acrylic polymer based powders.

SUMMARY OF THE INVENTION

A uniform mixture of one or more vinyl chloride polymers having pendant hydroxyl groups is blended with a cross-linker, such as hexamethoxymethylmelamine, and cellulose acetate butyrate, and is converted to a powder coating composition which can be applied in powder form to the surface of a substrate and cured to a uniform thermoset film. The compositions can also contain a blocked catalyst for improved cure and improved finished coating.

DESCRIPTION OF THE INVENTION

The vinyl chloride polymers suitable for use in producing the powder coating compositions are those containing a pendant hydroxyl group. This group is essential in the polymer molecule. The preferred polymers are those containing from about 75 to 95 weight percent, based on the weight of the polymer, of vinyl chloride, from 0 to 23 weight percent, based on the weight of the polymer, of vinyl acetate and from 2 to 20 weight percent, based on the weight of the polymer, of an hydroxyalkyl acrylate having from 2 to 6 carbon atoms in the alkyl group, or the vinyl alcohol moiety. If desired, the polymer can contain a small amount of one or more other ethylenically unsaturated polymerizable monomers having the >CH = CH< group polymerized therein. These other monomers can be any of the known ethylenically unsaturated monomers that can be copolymerized into the polymer molecule.

The preferred vinyl chloride polymers defined above are those which have a glass transition temperature of above about 40° C. The powder coating compositions also have such glass transition temperature and have been observed to possess good room temperature stability and do not agglomerate, bridge or block on storage when properly formulated. The preferred polymers are those that have a number average molecular weight of from about 5,000 to about 25,000. They are present in the blend at a concentration of from 40 to 90 weight percent.

Among suitable polymers, within the above description, one can mention vinyl chloride/vinyl acetate/2-hydroxypropyl acrylate, vinyl chloride/vinyl acetate/vinylidene chloride/vinyl alcohol, vinyl chloride/vinyl alcohol, vinyl chloride/2-hydroxy ethyl acrylate/vinyl acetate, vinyl chloride/vinyl acetate/hydroxybutyl acrylate, vinyl chloride/2-hydroxypropyl acrylate, and the like. This listing is simply illustrative and not all-encompassing.

Included in the powder coating composition is a crosslinker such as a melamine formaldehyde resin, a urea formaldehyde resin, a phenol formaldehyde resin, or a blocked isocyanate. The above defined compounds useful as such crosslinkers are well known to those skilled in the art and any of them can be used, including, for example, hexamethoxymethylmelamine.

The crosslinker is generally present in the powder coating compositions at a concentration of from 3 to 60 percent based on the weight of the vinyl chloride polymer. In the most preferred instance sufficient crosslinker equivalents should be present to react with the hydroxyl equivalents present in the vinyl chloride polymer.

The powder coating composition also contains from 10 to 30 percent by weight of said composition of cellulose acetate butyrate having a butyral content of from 45 to 60 percent, preferably from about 50 to 55 percent, and a viscosity of from 0.005 to 2.0 seconds as measured by the falling ball method described in ASTM D-1343-54-T. The presence of the cellulose acetate butyrate has a noticeable effect on the properties of the composition and imparts improvement in flow, levelling and gloss, and gloss retention after weathering, without interfering with the storage stability of the powder composition per se.

While the reaction between the pendant hydroxyl groups of the vinyl chloride polymer and the crosslinker will occur readily at temperatures of about 175° C. and above, in some instances some polymer degradation might occur which is undesirable. To expedite the reaction and at the same time minimize polymer degradation by affecting crosslinking at lower temperature, a catalyst can be used. The selected catalyst is one which does not cause premature reaction during preparation of the blend and grinding to the powder, or one which will not cause premature gellation of the applied powder on the substrate prior to adequate flow-out and fusion of the powder. In the absence of adequate flow-out a rough surface results. It is therefor necessary to retard the crosslinking reaction until a smooth continuous film has formed and yet to carry out this reaction under time and temperature conditions that will not cause degradation of the vinyl chloride polymer. This is accomplished through the use of a blocked acid catalyst, many of which are known to those skilled in the art. Among the useful catalysts are the alkyl esters of p-toluene sulfonic acid in which the alkyl group has from 1 to 4 carbon atoms; for example, methyl p-toluene sulfonic acid, ethyl p-toluene sulfonic acid, propyl p-toluene sulfonic acid, butyl p-toluene sulfonic acid, and isomers thereof. Also useful are the epoxy adducts of p-toluene sulfonic acid, such as the adduct of the bis-glycidyl ether of bisphenol-A and p-toluene sulfonic acid to mention but one of such known compounds. The preferred are the alkyl esters of p-toluene sulfonic acid. The blocked catalysts are preferred over the free acid catalysts such as p-toluene sulfonic acid per se since the free acid catalysts are generally too reactive and promote premature gellation. The catalyst is used at a concentration of from 0.01 to 1 percent by weight, based on the weight of the composition. The use of catalyst generally lowers the curing temperature sufficiently that degradation is avoided.

In preparing the blends of the defined vinyl chloride polymer, cellulose acetate butyrate, crosslinker and catalyst, when the catalyst is used, one can also include any of the conventional additives generally used in coating compositions. The amounts thereof and their identity are well known to those skilled in the art and do not require further discussion herein. Included are pigments and dyes such as titanium dioxide, cadmium red, carbon black, iron oxide; fillers such as calcium carbonate, barium sulfate, wood flour; stabilizers such as dibutyltin dilaurate, dibutyltin mercaptide, alkylated phenols, and bisphenols, barium-cadmium salts; fungicides; bactericides; flow control additives such as the 75/25 polymer of 2-ethyl-hexyl acrylate and ethyl acrylate. It is also within the scope of this invention to use mixtures of two or more of any of said vinyl chloride polymers, crosslinkers, cellulose derivatives, catalysts or additives in the powder coating compositions.

The vinyl chloride polymer, crosslinker, cellulose acetate butyrate, catalyst and additives can be blended by any of the known methods including solution blending, melt compounding at temperatures below the crosslinking temperature, dry blending, milling or any other known method or combination of methods. The formulated blend is then converted to a fine powder by any conventional means including cryogenic grinding, spray drying of a solution thereof, spray precipitation, mechanical grinding, fluid-energy milling or any combination thereof. Those skilled in this art are fully familiar with the procedures and the equipment necessary for the production of powders. The powder composition contains essentially all of the particles preferably ranging in size from about 1 micron to about 100 microns, preferably from 5 to 50 microns.

The powder compositions of this invention can be used to coat substrates in the same manner that powder coating compositions are applied at present.

The powder coating compositions of this invention produce smooth, uniform, thermoset films that are essentially free of craters. They possess the proper liquification so as to permit adequate flow during the oven curing cycle before crosslinking has occurred. They also have good adhesion to the substrate after cure.

The following examples serve to further define the invention.

EXAMPLE 1

A blend was prepared containing 100 parts by weight of an 80/5/15 vinyl chloride/vinyl acetate/2-hydroxypropyl acrylate polymer, 50 parts by weight of titanium dioxide, 5 parts by weight of hexamethoxymethylmelamine, 5 parts of weight of 3,4-epoxycyclohexylmethyl-3,4-epoxycyclohexane carboxylate, 3 parts by weight of an organic tin light and heat stabilizer (Thermolite 31-Super®), one part of a 75/25 2-ethylhexylacrylate/ethyl acrylate polymer and 15 parts of cellulose acetate butyrate having a butyral content of about 54.5 percent and a hydroxyl content of about 1.6 percent. The uniform blend was melt compounded in an extruder at 115° to 130° C. and pelletted. The pellets were cryogenically ground using nitrogen at −150° C. to a fine particle powder coating composition.

The powder coating composition was electrostatically applied to steel panels and cured at 204° C. for 3 minutes to yield a smooth uniform film of excellent adhesion, good leveling flow and a 60° gloss rating of 87. The powder remained free flowing after standing for 24 hours at 40° C.

In a comparative run in which the cellulose acetate butyrate was omitted, the cured coating had only fair leveling flow and a 60° gloss of 72. This shows the importance of having cellulose acetate butyrate in the powder coating composition.

In two other comparative runs, containing the liquid plasticizers epoxidized soybean oil and a polyester resin (paraplex G-25®) the powders caked severely on standing. These runs did not contain the cellulose acetate butyrate.

EXAMPLE 2

A series of powder coating compositions was prepared in the same manner described in Example 1. The compositions contained the following components in parts by weight:

| Run | A | B | C | D |
|---|---|---|---|---|
| Vinylchloride resin | 100 | → | | |
| Titanium dioxide | 50 | → | | |
| Cymel 310® | 10 | 20 | 10 | 10 |
| Epoxide * | 7 | 5 | 7 | 7 |
| Thermolite 31-Super® | 3 | → | | |
| CAB | 30 | → | | |
| Modaflow® | 1 | → | | |
| MpTSA | — | — | 1.08 | — |
| pTSA/Ep. Adduct ** | — | — | — | 10 |

Vinylchloride resin - as per Example 1.
Cymel 301 - hexamethoxymethylmelamine
Thermolite 31-Super - as per Example 1
CAB - cellulose acetate butyrate as per Example 1
Modaflow - 75/25 2-ethylhexyl acrylate/ethyl acrylate polymer
MpTSA - methyl p-toluene sulfonic acid

*3,4-epoxycyclohexylmethyl-3,4-epoxycyclohexane carboxylate
**adduct obtained by reaction of a solution of 20 grams of p-toluene sulfonic acid in 2-ethoxyethanol and a solt the bis-glycidyl ether of bisphenol-A in 40 grams of 2-ethoxyethanol at 100° C. for one hour.

The powder coating compositions were electrostatically applied to steel panels and cured at 150° C. for 30 minutes to yield uniform films of good leveling properties.

In comparative runs, the same formulation with as little as 0.3 parts by weight p-toluene sulfonic acid as catalyst showed poor to bad leveling. In one instance, using a concentration of one percent, based on the vinyl polymer, the blend gelled during formulation in the extruder. These results illustrate the advantage to employing blocked acid catalysts rather than conventional strong acid catalysts.

EXAMPLE 3

A series of powder coating compositions was prepared in the same manner described in Example 1 using a blocked isocyanate as the crosslinking agent. The composition contained the same components as defined in Example 2, unless otherwise indicated, in parts by weight as shown below:

| Run | A | B |
| --- | --- | --- |
| Vinylchloride resin | 100 | 100 |
| Titanium dioxide | 50 | 50 |
| Epoxide | 7 | 7 |
| Thermolite 31-Super ® | 3 | 3 |
| CAB | 30 | 30 |
| Modaflow R | 1 | 1 |
| Stannous octoate | 0.25 | 0.25 |
| Blocked isocyanate * | 5 | 10 |

* Caprolactam blocked isocyanate (cargill CR-10 ®)

The powder coating compositions were electrostatically applied to steel panels and cured at 177° C. for 10, 15 and 25 minutes periods. The cured films had the following properties:

| | A | B |
| --- | --- | --- |
| Solvent resistance after cure for: | | |
| 10 minutes | 5 | 15 |
| 15 minutes | 25 | 100 |
| 25 minutes | 100 | 100 |
| 60° Gloss | 85 | 90 |
| Levelling | Good | Good |

Solvent resistance is reported as the number of double rubs of a cheesecloth saturated with methyl ethyl ketone required to remove the coating and expose the substrate. The test is stopped at 100, which is indicative of good solvent resistance.

What I claim is:

1. A thermosetting vinyl chloride polymer powder coating composition comprising finely divided particles; wherein the powder particles are of a blend of constitutents consisting essentially of:
   A. 40 to 90 percent by weight of said composition of a vinyl chloride polymer having pendant hydroxyl groups consisting essentially of
      i. 75 to 95 percent of weight, based on the weight of said vinyl chloride polymer, of vinyl chloride,
      ii. 2 to 20 percent by weight, based on the weight of said vinyl chloride polymer, of an hydroxyalkyl acrylate having from 2 to 6 carbon atoms in the alkyl group, or the vinyl alcohol moiety,
      iii. 0 to 23 percent by weight, based on the weight of said vinyl chloride polymer, of vinyl acetate; wherein the vinyl chloride polymer has a number average molecular weight of from 5,000 to 25,000 and a glass transition temperature above 40° C.;
   B. 3 to 60 percent by weight of said vinyl chloride polymer of a melamine formaldehyde resin, urea formaldehyde resin, phenol formaldehyde resin, or blocked isocyanate crosslinker; and
   C. 10 to 30 percent by weight of said composition of cellulose acetate butyrate having a butyral content of from 45 to 60 percent.

2. A thermosetting vinyl chloride polymer powder coating composition as claimed in claim 1, wherein a blocked acid catalyst is additionally present at a concentration of from 0.01 to 1 percent by weight, based on the weight of said composition.

3. A thermosetting vinyl chloride polymer powder coating composition as claimed in claim 1, wherein component (A) is an 80/5/15 vinyl chloride/vinyl acetate/2-hydroxypropyl acrylate polymer.

4. A thermosetting vinyl chloride polymer powder coating composition as claimed in claim 1, wherein component (B) is hexamethoxymethylmelamine.

5. A thermosetting vinyl chloride polymer powder coating composition as claimed in claim 2, wherein the catalyst is an alkyl ester of p-toluene sulfonic acid having from 1 to 4 carbon atoms in the alkyl group.

* * * * *